(12) United States Patent
Skog et al.

(10) Patent No.: US 10,630,813 B2
(45) Date of Patent: Apr. 21, 2020

(54) TRANSPORTING UDP PACKETS OVER AN MPTCP CONNECTION

(71) Applicant: TELEFONAKTIEBOLAGET LM ERICSSON (PUBL), Stockholm (SE)

(72) Inventors: Robert Skog, Hässelby (SE); Marcus Ihlar, Uppsala (SE); John Orre, Saltsjöbaden (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 404 days.

(21) Appl. No.: 15/106,157

(22) PCT Filed: May 16, 2016

(86) PCT No.: PCT/EP2016/060936
§ 371 (c)(1),
(2) Date: Jun. 17, 2016

(87) PCT Pub. No.: WO2017/198285
PCT Pub. Date: Nov. 23, 2017

(65) Prior Publication Data
US 2018/0103123 A1    Apr. 12, 2018

(51) Int. Cl.
*G06F 15/16* (2006.01)
*H04L 29/06* (2006.01)
*H04L 29/08* (2006.01)

(52) U.S. Cl.
CPC ............ *H04L 69/14* (2013.01); *H04L 67/142* (2013.01); *H04L 69/161* (2013.01); *H04L 69/165* (2013.01)

(58) Field of Classification Search
CPC ..... H04L 69/14; H04L 67/142; H04L 67/161; H04L 69/165
(Continued)

(56) References Cited

U.S. PATENT DOCUMENTS

| 8,400,923 B2 * | 3/2013 | Kini ........................ H04L 45/24 370/235 |
| 8,811,329 B2 * | 8/2014 | Haddad .................. H04L 29/06 370/329 |

(Continued)

OTHER PUBLICATIONS

M. Boucadair, An MPTCP Option for Network-Assisted MPTCP deployments: Plan Transport Mode, Dec. 2015 (Year: 2015).*
(Continued)

*Primary Examiner* — Randy A Scott
*Assistant Examiner* — Mariegeorges A Henry
(74) *Attorney, Agent, or Firm* — Rothwell, Figg, Ernst & Manbeck, P.C.

(57) ABSTRACT

A Multipath Transmission Control Protocol (MPTCP) client and an MPTCP server for transporting User Datagram Protocol (UDP) packets in plain transport mode are provided. The MPTCP client is operative to receive a request for establishing an MPTCP connection for transporting UDP packets between the MPTCP client and the MPTCP server, establish the MPTCP connection, wherein information identifying one or more transport control functions are to be applied to UDP packets which are transported over the MPTCP connection is transmitted to the MPTCP server during establishing the MPTCP connection, and apply the one or more transport control functions to UDP packets. Correspondingly, the MPTCP server is operative to receive, during establishing the MPTCP connection with an MPTCP client, from the MPTCP client the information identifying one or more transport control functions, and apply the one or more transport control functions to UDP packets which are transported over the MPTCP connection.

21 Claims, 7 Drawing Sheets

(58) Field of Classification Search
USPC .................................................. 709/231, 230
See application file for complete search history.

(56) References Cited

U.S. PATENT DOCUMENTS

| | | | |
|---|---|---|---|
| 9,888,042 B2* | 2/2018 | Annamalaisami | ........................... H04L 65/1069 |
| 2005/0086353 A1* | 4/2005 | Shirakawa | .............. H04L 29/06 709/230 |
| 2015/0009999 A1* | 1/2015 | Oguchi | ................ H04L 69/169 370/392 |
| 2016/0360557 A1* | 12/2016 | Lavi | ...................... H04W 76/10 |
| 2017/0318484 A1* | 11/2017 | Lindheimer | .......... H04W 24/04 |

OTHER PUBLICATIONS

Boucadair et al. "An MTCP Option for Network-Assisted MPTCP Deployments: Plain Transport Mode," Network Working Group, Nov. 11, 2015, 14 Pages.

Borman, D. "TCP Four-Way Handshake; draft-borman-tcpm-tcp4way-00.txt", Internet Engineering Task Force, IETF; Standardworkingdraft, Internet Society (ISOC) 4, Rue Des Falaises CH-1205, Geneva, Switzerland, Oct. 24, 2014 (Oct. 24, 2014), pp. 1-21, XP015102436.

International Search Report and Written Opinion dated Dec. 13, 2016, issued in PCT/EP2016/060936, 12 pages.

Boucadair et al. "An MTCP Option for Network-Assisted MPTCP Deployments: Plain Transport Mode," Network Working Group, Dec. 8, 2015, 14 Pages.

Ford et al. "TCP Extensions for Multipath Operation with Multiple Addresses," Internet Engineering Task Force (IETF), Jan. 2013, 64 Pages.

* cited by examiner

TRANSPORTING UDP PACKETS OVER AN MPTCP CONNECTION

This application is a 35 U.S.C. § 371 National Phase Entry Application from PCT/EP2016/060936, filed May 16, 2016, designating the United States, the disclosure of which is incorporated herein in its entirety by reference.

TECHNICAL FIELD

The invention relates to a Multipath Transmission Control Protocol (MPTCP) client for transporting User Datagram Protocol (UDP) packets over an MPTCP connection, an MPTCP server for transporting UDP packets over an MPTCP connection, methods of transporting UDP packets over an MPTCP connection, the methods being performed by an MPTCP client and an MPTCP server, respectively, corresponding computer programs, and corresponding computer program products.

BACKGROUND

Communication via the Transmission Control Protocol (TCP) and Internet Protocol (IP) is restricted to a single network path per connection, even though multiple network paths may exist between the peers of the connection. For instance, a mobile terminal may simultaneously be connected to a cellular radio access network, such as Global System for Mobile Communications (GSM), Universal Mobile Telecommunications System (UMTS), or Long Term Evolution (LTE), network, and a Wireless Local Area Network (WLAN) or WiFi access network. Likewise, modern residential gateways, or home gateways, for deployment at customer premises oftentimes provide access to the Internet by means of cellular connectivity in addition to a wired access, such as a Digital Subscriber Line (DSL) service.

Multipath TCP (MPTCP) is an ongoing effort of the Internet Engineering Task Force (IETF) and aims at allowing an end-to-end TCP connection to use multiple paths to maximize resource usage and increase redundancy, thereby improving user experience (see, e.g., RFC 6824, http://tools.ietf.org/html/rfc6824). MPTCP extends TCP so that it presents a standard TCP interface to applications while in fact spreading data across several MPTCP subflows, i.e., separate TCP connections, typically using disjoint network paths. MPTCP is designed to be backwards compatible with plain TCP.

MPTCP is particularly useful in the scenarios described above. For instance, a mobile terminal using both a WLAN/WiFi access network and a cellular radio access network may experience a gain in throughput and connection reliability as the mobile terminal moves in or out of coverage without disrupting the end-to-end TCP connection. The problem of handover between MPTCP subflows is solved by abstraction in the transport layer, without any special mechanisms at the network or link level. Advantageously, when used in connection with residential gateways for providing Internet access, the Internet service provider may control the behavior of the residential gateway and thereby steer the traffic so as to optimize user experience and reduce cost. For instance, residential gateways may be configured to predominantly use DSL or any other wired access, whereas the cellular communications network is only used for excess traffic.

While MPTCP is designed as an extension to standard TCP, there are efforts to extend its use to the User Datagram Protocol (UDP) with the aim of offering multi-path support for also for UDP (see, e.g., "An MPTCP Option for Network-Assisted MPTCP Deployments: Plain Transport Mode", IETF Internet-Draft, draft-boucadair-mptcp-plain-mode-06). UDP is one of the core members of the Internet protocol suite and is formally defined in RFC 768. It uses a simple connectionless transmission model with a minimum of protocol mechanism. UDP has no handshaking dialogues, and thus exposes the application utilizing UDP to any unreliability of the underlying network protocol. There is no guarantee of delivery, ordering, or duplicate protection. With UDP, a peer can send messages, also referred to as datagrams, to other peers on an IP network without prior communications to set up special transmission channels or data paths. UDP is suitable for purposes where error checking and correction is either not necessary or is performed at a higher level in the protocol stack. Time-sensitive applications often use UDP because dropping packets is preferable to waiting for delayed packets, which may not be an option in a real-time system. If error correction needed at the network interface level, an application may, e.g., use TCP or the Stream Control Transmission Protocol (SCTP) which are designed for this purpose.

The basic idea put forward in draft-boucadair-mptcp-plain-mode-06 is to tunnel UDP packets inside MPTCP packets over an MPTCP connection. This mode of operation of MPTCP is referred to as "plain mode" or "plain transport mode". In view of the fact that transport control functions like ordered transfer, retransmission of lost packets, flow control, and congestion control, which are commonly used in TCP are absent in UDP, draft-boucadair-mptcp-plain-mode-06 proposes that such functionality is disabled in plain transport mode and that enabling such features is deployment and implementation-specific.

SUMMARY

It is an object of the invention to provide an improved alternative to the above techniques and prior art.

More specifically, it is an object of the invention to provide improved solutions for multi-path UDP transport over MPTCP connections.

These and other objects of the invention are achieved by means of different aspects of the invention, as defined by the independent claims. Embodiments of the invention are characterized by the dependent claims.

According to a first aspect of the invention, an MPTCP client for transporting UDP packets over an MPTCP connection is provided. The MPTCP client is operative to receive a request for establishing an MPTCP connection for transporting UDP packets between the MPTCP client and an MPTCP server and establish the MPTCP connection. During establishing the MPTCP connection, information identifying one or more transport control functions is transmitted to the MPTCP server. The one or more transport control functions are to be applied to UDP packets which are transported over the MPTCP connection. The MPTCP client is further operative to apply the one or more transport control functions to UDP packets which are transported over the MPTCP connection.

According to a second aspect of the invention, an MPTCP server for transporting UDP packets over an MPTCP connection is provided. The MPTCP server is operative to receive, from an MPTCP client, information identifying one or more transport control functions. The one or more transport control functions are to be applied to UDP packets which are transported over the MPTCP connection. The information is received during establishing the MPTCP connection with the MPTCP client. The MPTCP server is further operative to apply the one or more transport control functions to UDP packets which are transported over the MPTCP connection.

According to a third aspect of the invention, a method of transporting UDP packets over an MPTCP connection is provided. The method is performed by an MPTCP client. The method comprises receiving a request for establishing an MPTCP connection for transporting UDP packets between the MPTCP client and an MPTCP server and establishing the MPTCP connection. During establishing the MPTCP connection, information identifying one or more transport control functions is transmitted to the MPTCP server. The one or more transport control functions are to be applied to UDP packets which are transported over the MPTCP connection. The method further comprises applying the one or more transport control functions to UDP packets which are transported over the MPTCP connection.

According to a fourth aspect of the invention, a method of transporting UDP packets over an MPTCP connection is provided. The method is performed by an MPTCP server. The method comprises receiving, from an MPTCP client, information identifying one or more transport control functions. The one or more transport control functions are to be applied to UDP packets which are transported over the MPTCP connection. The information is received during establishing the MPTCP connection with the MPTCP client. The method further comprises applying the one or more transport control functions to UDP packets which are transported over the MPTCP connection.

According to a fifth aspect of the invention, a computer program is provided. The computer program comprises computer-executable instructions for causing a device to perform the method according to an embodiment of the third or fourth aspect of the invention, when the computer-executable instructions are executed on a processing unit comprised in the device.

According to a sixth aspect of the invention, a computer program product is provided. The computer program product comprises a computer-readable storage medium which has the computer program according to the fifth aspect of the invention embodied therein.

In the present context, a network path, or path, is to be understood as a sequence of links between two peers or hosts, a sender and a receiver, and is defined by a 4-tuple of source IP address, source port number, destination IP address, and destination port number. Further, an MPTCP subflow is a flow of TCP segments operating over an individual path, which forms part of an MPTCP connection. An MPTCP connection is a set of one or more subflows over which an application can communicate between two hosts. An MPTCP subflow is started and terminated similar to a regular TCP connection, as is described in further detail below.

The invention makes use of an understanding that an improved transport of UDP packets, also known as UDP datagrams, over an MPTCP connection in "plain mode" or "plain transport mode" (see, e.g., draft-boucadair-mptcp-plain-mode-06) can be achieved by selectively applying transport control functions which are commonly used for TCP, also to UDP packets which are transported over the MPTCP connection. Since such transport control functions, commonly known as TCP functions, are not defined for UDP, there is a need for the endpoints of the MPTCP connection to share information about which transport control functions are to be used for UDP packets which are transported over the MPTCP connection. In particular, this is the case since it was proposed (see draft-boucadair-mptcp-plain-mode-06) that such transport control functions are disabled in plain transport mode and that enabling such features is deployment and implementation-specific. Hence, an MPTCP server, e.g., has no means of determining which transport control functions it should apply to UDP packets without receiving explicit information from the MPTCP client which has initiated the connection MPTCP, or from an entity providing corresponding information to both the MPTCP client and the MPTCP server.

The embodiments described herein convey information for identifying the selected transport control functions to be applied to UDP packets from the MPTCP client to the MPTCP server. Throughout this disclosure, it is assumed that the MPTCP client initiates the establishment of an MPTCP connection with the MPTCP server, as is known in the art and described in more detail further below. To this end, both the MPTCP client and the MPTCP server implement the MPTCP stack as an extension to the conventional TCP stack. The MPTCP client and the MPTCP server may, e.g., be implemented as MPTCP proxies for deployment as intermediate network nodes in a network path between a UDP client and a UDP server. Thereby, an MPTCP-capable UDP client may establish an MPTCP connection with a non-MPTCP-capable UDP server, via an MPTCP proxy which is deployed upstream from the UDP client, preferably close to the UDP server, and acting as MPTCP server. In addition, a non-MPTCP-capable UDP client may establish an MPTCP connection with an MPTCP-capable UDP server, via an MPTCP proxy deployed downstream from the origin server, preferably close to the UDP client, and acting as MPTCP client. Even further, a non-MPTCP-capable UDP client and a non-MPTCP-capable UDP server may communicate over an MPTCP connection via two MPTCP proxies which are deployed along the network path between the UDP client and the UDP server and acting as MPTCP client and MPTCP server, respectively. Preferably, an MPTCP proxy implements both the MPTCP client and the MPTCP server.

The MPTCP client and/or the MPTCP server, or the MPTCP proxy, may be provided in a UDP client, i.e., a client device such as a mobile terminal, e.g., a smartphone, tablet computer, laptop, or the like. Thereby, applications which are executed in the client device and which rely on UDP for communicating with an UDP server, such as an origin server, may utilize multiple network paths, e.g., via a cellular radio access network and via a WLAN/WiFi access network, to increase bandwidth and improve connection reliability. As a further example, the MPTCP client and/or the MPTCP server, or the MPTCP proxy, may alternatively be provided in a residential gateway of a type which oftentimes is provided by Internet Service Providers (ISPs) for deployment at customer premises. Such residential gateways, also known as Customer Premise Equipment (CPE), are used for providing Internet access over a cellular radio access network, e.g., GSM, UMTS, or LTE, in addition to a wired connection, e.g., DSL. Apart from an increase in bandwidth and improved connection reliability, the ISP has the opportunity to control the flow of data, i.e., packets, over the two available connections such that the less expensive DSL connection is utilized for most of the traffic, whereas surplus traffic is routed over the cellular connection. In such scenario, a further MPTCP proxy, referred to as Concentrator, is oftentimes deployed as the other end of the MPTCP connection in the ISP's network, The request for establishing an MPTCP connection for transporting UDP packets between the MPTCP client and the MPTCP server may, e.g., be received from a UDP client, e.g., if the MPTCP client is provided in a residential gateway, and the UDP client accesses the origin server via the residential gateway. In particular, the request for establishing an MPTCP connection may be a UDP packet which is received by the MPTCP client from the UDP client, e.g., the first packet of a UDP-based service which is initiated or requested by the UDP client. As a further example, if the MPTCP client is implemented in the same device as a UDP client, such as a mobile terminal, the request for establishing the MPTCP connection may be received from an application being executed by the device. In this case, the application assumes the role of the UDP client. Alternatively, the request for establishing the MPTCP connection may be received from an ISP managing the residential gateway. For instance, such a request may be received during startup when the residential gateway connects to a network of the ISP. Thereby, the ISP may configure residential gateways to setup static MPTCP connections for use by UDP clients connecting to the Internet via the residential gateway. As a further example, if the MPTCP client is implemented in the same device as a UDP client, such as a mobile terminal, the request for establishing the MPTCP connection may be received from an application being executed by the device. In this case, the application assumes the role of the UDP client.

According to an embodiment of the invention, the one or more transport control functions are selected by the MPTCP client. Preferably, the one or more transport control functions are selected based on information comprised in the request for establishing an MPTCP connection for transporting UDP packets. As an example, if the request for establishing an MPTCP connection is a UDP packet which is received from a UDP client, the MPTCP client may retrieve configuration information based on address/port information and/or a protocol number comprised in the UDP packet. As a further example, if the request is received from an application being executed in a client device comprising the MPTCP client, the application acting as UDP client may transmit configuration information with the request, the configuration information identifying one or more transport control functions which are to be applied in plain transport mode. Even further, if the request for establishing an MPTCP connection is received from an ISP, e.g., during startup of a residential gateway comprising the MPTCP client, the request may comprise configuration information pertaining to a static MPTCP connection between the MPTCP client comprised in the residential gateway and a network node in the ISP's network acting as MPTCP server, also known as Concentrator. In particular, the configuration information may identify one or more transport control functions which are to be applied in plain transport mode, i.e., when UDP packets are transported over the static MPTCP connection. Advantageously, the one or more transport control functions may be selected based on the type and character of one or more services utilizing UDP.

According to an embodiment of the invention, the MPTCP connection is established by establishing at least one TCP connection as an MPTCP subflow between the MPTCP client and the MPTCP server. The information identifying the one or more selected transport control functions may, e.g., be transmitted by the MPTCP client as a TCP Option in a TCP SYN packet. Correspondingly, the information identifying the one or more selected transport control functions may, e.g., be received by the MPTCP server as a TCP Option in a TCP SYN packet. The TCP Option is a variable-length field in the TCP header which may be used for conveying optional information, such as the MPTCP Options described further below. The TCP SYN packet is transmitted by the MPTCP client, and received by the MPTCP server, during establishing a TCP connection. Preferably, the information identifying the one or more selected transport control functions is conveyed during establishing the first subflow, but may alternatively be conveyed during establishing an additional subflow. Alternatively, the information identifying the one or more selected transport control functions may be conveyed in an IP Option, in a TCP packet which is sent after the MPTCP connection has been established, or as payload in a TCP packet.

Even though advantages of the invention have in some cases been described with reference to embodiments of the first aspect of the invention, corresponding reasoning applies to embodiments of other aspects of the invention.

Further objectives of, features of, and advantages with, the invention will become apparent when studying the following detailed disclosure, the drawings and the appended claims. Those skilled in the art realize that different features of the invention can be combined to create embodiments other than those described in the following.

BRIEF DESCRIPTION OF THE DRAWINGS

The above, as well as additional objects, features and advantages of the invention, will be better understood through the following illustrative and non-limiting detailed description of embodiments of the invention, with reference to the appended drawings, in which.

All the figures are schematic, not necessarily to scale, and generally only show parts which are necessary in order to elucidate the invention, wherein other parts may be omitted or merely suggested.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein. Rather, these embodiments are provided by way of example so that this disclosure will be thorough and complete, and will fully convey the scope of the invention to those skilled in the art.

Figure 1:
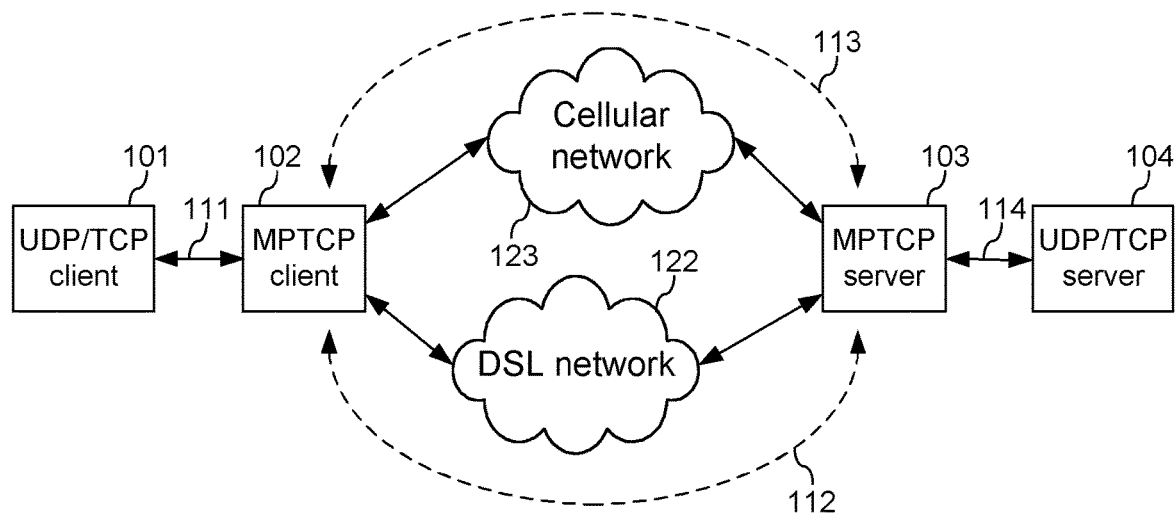
FIG. 1 illustrates an MPTCP scenario, in accordance with embodiments of the invention.

In FIG. 1, an example of utilizing MPTCP to increase bandwidth and improve reliability of a TCP connection between a client 101 and a server 104 is illustrated. Throughout this disclosure, it is assumed that client 101 and server 104 are capable of communicating via TCP and UDP, and are accordingly also referred to as UDP/TCP client 101 and UDP/TCP server 104, respectively. The terminology "client" and "server" as used herein refers to the distinct roles of the two peers in a connection, wherein the client requests data from the server, or initiates a service which is provided by the server.

In the present context, UDP/TCP client 101 may be any device capable of effecting communications with UDP/TCP server 104 providing content to UDP/TCP client 101, such as a web server, an email server, a media server, a node of a Content Distribution Network (CDN), or the like. For instance, UDP/TCP client 101 may be a mobile terminal, a User Equipment (UE), a mobile phone, a smartphone, a tablet, a laptop, or a personal computer. Communications between UDP/TCP client 101 and UDP/TCP server 104 may be effected though one or more communications networks 111-114, wired or wireless, or a combination thereof. In particular, a communications network may be any one of a cellular radio access network, such as GSM, UMTS, LTE, or WiMAX, a Local Area Network (LAN), a WLAN/WiFi access network, an Ethernet network, a corporate network, and the Internet.

In the scenario illustrated in FIG. 1, it is assumed that communications between UDP/TCP client 101 and UDP/TCP server 104, i.e., the transport of TCP packets or UDP packets, is effected over a sequence of links, e.g., a first link between UDP/TCP client 101 and a first MPTCP proxy 102 over a LAN 111, a second link between first MPTCP proxy 102 and a second MPTCP proxy 103 over two disjoint network paths 112 and 113, and a third link between second MPTCP proxy 103 and UDP/TCP server 104 over a Wide Area Network (WAN) 114, e.g., the Internet.

In general, a proxy is a network node or an application which acts as an intermediary for requests from clients, such as UDP/TCP client 101, seeking resources from a server, such as UDP/TCP server 104, e.g., an origin server, a web server, a media server, a server of a cloud storage, a streaming server, a server of a CDN, and the like. In the present context, an MPTCP proxy may be provided at both endpoints of an MPTCP connection, as is illustrated in FIG. 1. More specifically, on the client side, first MPTCP proxy 102 may be provided as an intermediate protocol layer for interfacing requests from applications at higher protocol layers, originating from UDP/TCP client 101, for setting up a TCP connection with UDP/TCP server 104. In response to such requests, MPTCP proxy 102 may, acting as an MPTCP client, establish an MPTCP connection with an MPTCP-capable server, or alternatively with second MPTCP proxy 103 deployed upstreams in the network and acting as MPTCP server. Correspondingly, second MPTCP proxy 103 which is deployed on the network-side, i.e., upstream from the UDP/TCP client 101, may act as an MPTCP server to communicate with an MPTCP-capable client, or alternatively with client-side first MPTCP proxy 102 acting as MPTCP client.

Figure 2:
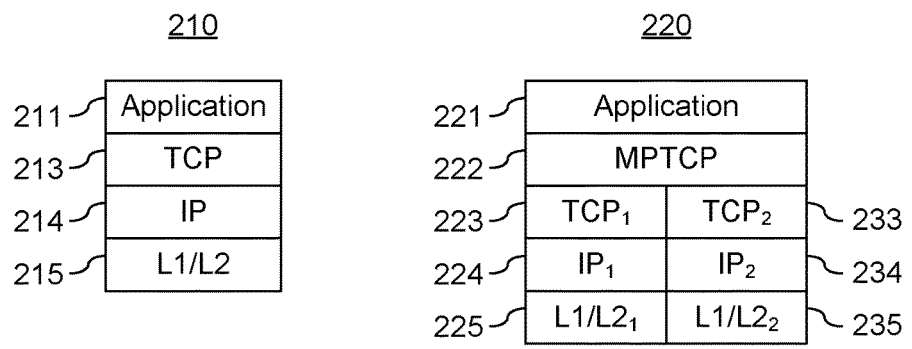
FIG. 2 shows the TCP stack and the MPTCP stack, in accordance with embodiments of the invention.

MPTCP aims at allowing an end-to-end TCP connection, e.g., between UDP/TCP client 101 and UDP/TCP server 104, to utilize multiple network paths 112 and 113 via access networks 122 and 123, respectively, to maximize resource usage and increase redundancy. This is achieved by extending the standard TCP stack 210 shown in FIG. 2. More specifically, an MPTCP layer 222 of an MPTCP stack 220 presents a standard TCP interface to applications (such as application 221 illustrated as uppermost layer of MPTCP stack 220) requesting an end-to-end TCP connection, while in fact spreading data across several subflows, i.e., separate TCP connections which are associated with separate TCP interfaces $TCP_1$ 223 and $TCP_2$ 233, using disjoint network paths 112 and 113, respectively. The additional MPTCP layer 222 acts as an interface for providing a single end-to-end TCP connection by combining a plurality of TCP interfaces $TCP_1$ 223 and $TCP_2$ 233, wherein each TCP interface 223 and 233 has their own stack towards lower layers, i.e., $IP_1$ 224 and $L1/L2_1$ 225 for $TCP_1$ 223, and $IP_2$ 234 and $L1/L2_2$ 235 for $TCP_2$ 233, respectively. The functionally of MPTCP layers 221, 223-225, and 233-235, corresponds to that of TCP layers 211 and 213-215, respectively. It will be appreciated that an MPTCP connection may comprise any number of subflows other than two, including one.

In the scenario depicted in FIG. 1, it is assumed that one of the subflows 112 is carried over a wired access network 122, e.g., a DSL network, whereas the additional subflow 113 is carried over a cellular access network 123, such as a UMTS or LTE network. This situation is common in hybrid-access solutions which ISPs utilize for providing customers with Internet access having increased bandwidth and reliability. Typically, a home gateway, or residential gateway, which is deployed at premises of the customer, implements the client-side MPTCP proxy 102 for providing Internet access over two access networks simultaneously, e.g., DSL network 122 and a UMTS or LTE network 123. Oftentimes, IPSs configure their residential gateways to apply some form of policy to control the distribution of traffic over the access networks 122 and 123. For instance, a residential gateway acting as MPTCP proxy 102 may utilize the cheaper link over DSL access network 122 for most of the traffic between UDP/TCP client 101 and UDP/TCP server 104, or any other UDP/TCP server accessible through WAN 114, whereas the additional wireless access network 123 is utilized for surplus traffic or when DSL access network 122 suffers from congestion or outage.

It has been suggested (see, e.g., draft-boucadair-mptcp-plain-mode-06) to extend the multi-path capabilities offered by MPTCP also to UDP flows, i.e., to transport UDP packets, or UDP datagrams, between UDP/TCP client 101 and UDP/TCP sever 104 by means of an MPTCP connection. The MPTCP connection may either be set up statically, e.g., as configured by an ISP managing a residential gateway acting as MPTCP client 102, or in response to receiving a UDP packet as an indicator that UDP/TCP client 101 has initiated or requested a UDP-based service. Typically, UDP is utilized by applications which do not require the same level of reliability and congestion control mechanisms as are provided by TCP. Numerous key Internet applications use UDP, including the Domain Name System (DNS), the Simple Network Management Protocol (SNMP), the Routing Information Protocol (RIP), and the Dynamic Host Configuration Protocol (DHCP). In addition, voice and video traffic is generally transmitted using UDP. This is the case since real-time video and audio streaming protocols are designed to handle occasional lost packets, resulting in a slight degradation in quality which is preferred to the oftentimes large delays caused by packets retransmission. Further, some Virtual Private Network (VPN) solutions such as OpenVPN may use UDP while implementing reliable connections and error checking at the application level.

The basic idea which is put forward in draft-boucadair-mptcp-plain-mode-06 is to tunnel UDP packets inside MPTCP packets over an existing, typically static, MPTCP connection. Thereby, the multi-path capabilities offered by MPTCP may also be utilized for UDP traffic, resulting in an increase in bandwidth and redundancy, and providing ISPs with the opportunity to apply policies for steering and distributing UDP traffic over two or more available access networks. In view of the fact that transport control functions like ordered transfer, retransmission of lost packets, flow control, and congestion control, which are commonly used in TCP are absent in UDP, it has been proposed that such functionality is disabled in plain transport mode and that enabling such features is deployment and implementation-specific.

In contrast to the conventional use of UDP, i.e., without any transport control functions, embodiments of the invention apply transport control functions which are known from TCP, and which are commonly known as TCP functions, also to UDP traffic in a configurable manner. Examples of such transport control functions are in-order or ordered delivery, i.e., delivery of data packets in accordance with a sequence number, retransmission of lost data packets, flow control, and congestion control. Whether or not a specific transport control function is useful for UDP traffic may be dependent on the specific application, type of application, or service, utilizing UDP, and in particular the application's requirements on delay, latency, jitter, and so forth. As an example, the distinct network paths 112 and 113 over access networks 122 and 123, respectively, typically experience different round-trip times (RTTs), which may result in an out-of-order arrival of packets transmitted by MPTCP client 102 at MPTCP server 103, or vice versa. In order to relieve the UDP client or UDP application from handling such out-of-order delivery caused by the MPTCP connection, MPTCP proxies 102 and 103 may be configured to apply in-order/ordered delivery, and/or any other transport control function, also to UDP packets which are transported in plain transport mode.

Embodiments of the invention are advantageous in that they provide a solution for conveying information identifying one or more transport control function(s) which is/are to be applied in plain transport mode, i.e., to UDP packets which are transported as TCP packets over the MPTCP connection between MPTCP proxies 102 and 103. For the purpose of elucidating embodiments of the invention, transporting UDP packets upstreams from UDP/TCP client 101 to UDP/TCP server 104, and vice versa, i.e., downstreams from UDP/TCP server 104 to UDP/TCP client 101, via an MPTCP connection between MPTCP client 102 and MPTCP server 103, is described in the following with reference to the signaling diagrams shown in FIGS. 3 and 4. Throughout this disclosure, it is to be understood that the terms MPTCP client and MPTCP server are used for denoting a role that each of these nodes has in establishing an MPTCP connection. In particular, it is the MPTCP client which initiates establishing the MPTCP connection by transmitting a TCP SYN packet with MPTCP Option "MP_CAPABLE" to the MPTCP server, as is described below. Advantageously, both endpoints 102 and 103 of the MPTCP connection implement both roles, i.e., MPTCP client and MPTCP server, in an MPTCP proxy.

Figure 3:
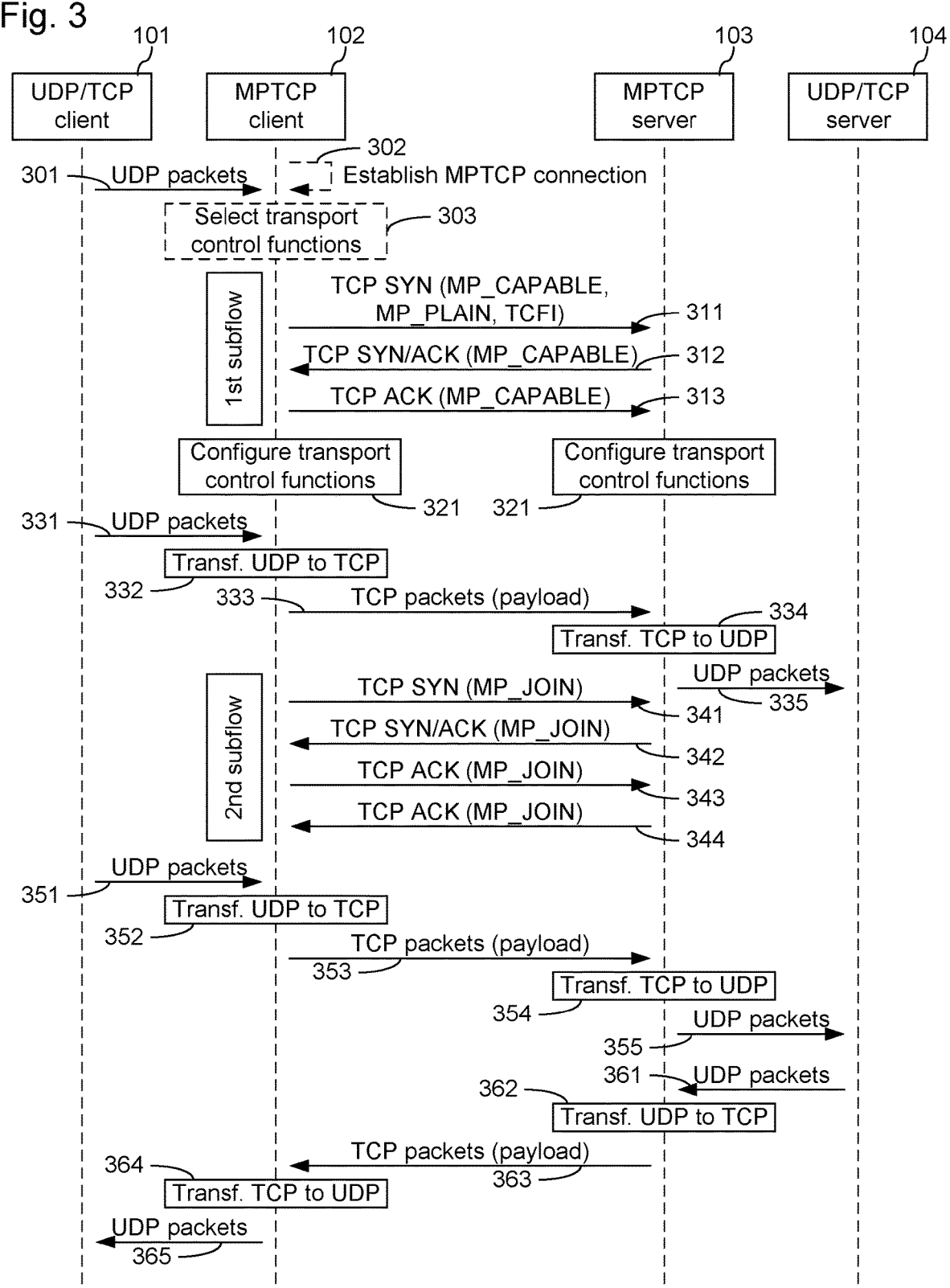
FIG. 3 illustrates transporting UDP packets over an MPTCP connection, in accordance with an embodiment of the invention.

In FIG. 3, MPTCP client 102 receives a request for establishing an MPTCP connection for transporting UDP packets between MPTCP client 102 and MPTCP server 103. Throughout this disclosure, it is to be understood that the terms MPTCP client and MPTCP server are used for denoting a role that each of these nodes has in establishing an MPTCP connection. In particular, it is the MPTCP client which initiates establishing the MPTCP connection by transmitting a TCP SYN packet with MPTCP Option "MP_CAPABLE" to the MPTCP server, as is described further below. Advantageously, both endpoints 102 and 103 of the MPTCP connection implement both roles, i.e., MPTCP client and MPTCP server, in an MPTCP proxy.

It is also noted that the need for the request for establishing an MPTCP connection for transporting UDP packets stems from the fact that UDP is a connectionless protocol. Hence, the MPTCP connection need to be established before UDP traffic can commence. As an example, the endpoints involved in establishing the connection, MPTCP client 102 and MPTCP server 103, may be operative to establish an MPTCP connection for the purpose of transporting UDP packets in response to receiving a request 301 from UDP/TCP client 101. In particular, request 301 may be a UDP packet from UDP/TCP client 101, which UDP packet is indicative of UDP/TCP client 101 being engaged in UDP-based communications, e.g., initiating or requesting a UDP-based service. As an alternative, the MPTCP connection may be established in response to receiving a request 302 from an ISP, or rather a network node of the ISP, with which MPTCP client 102 is associated (e.g., being implemented in a residential gateway provided by the ISP). The static MPTCP connection may be maintained until a request for terminating the MPTCP connection is received from the ISP, or until a timer triggers terminating the MPTCP connection.

Figure 5:
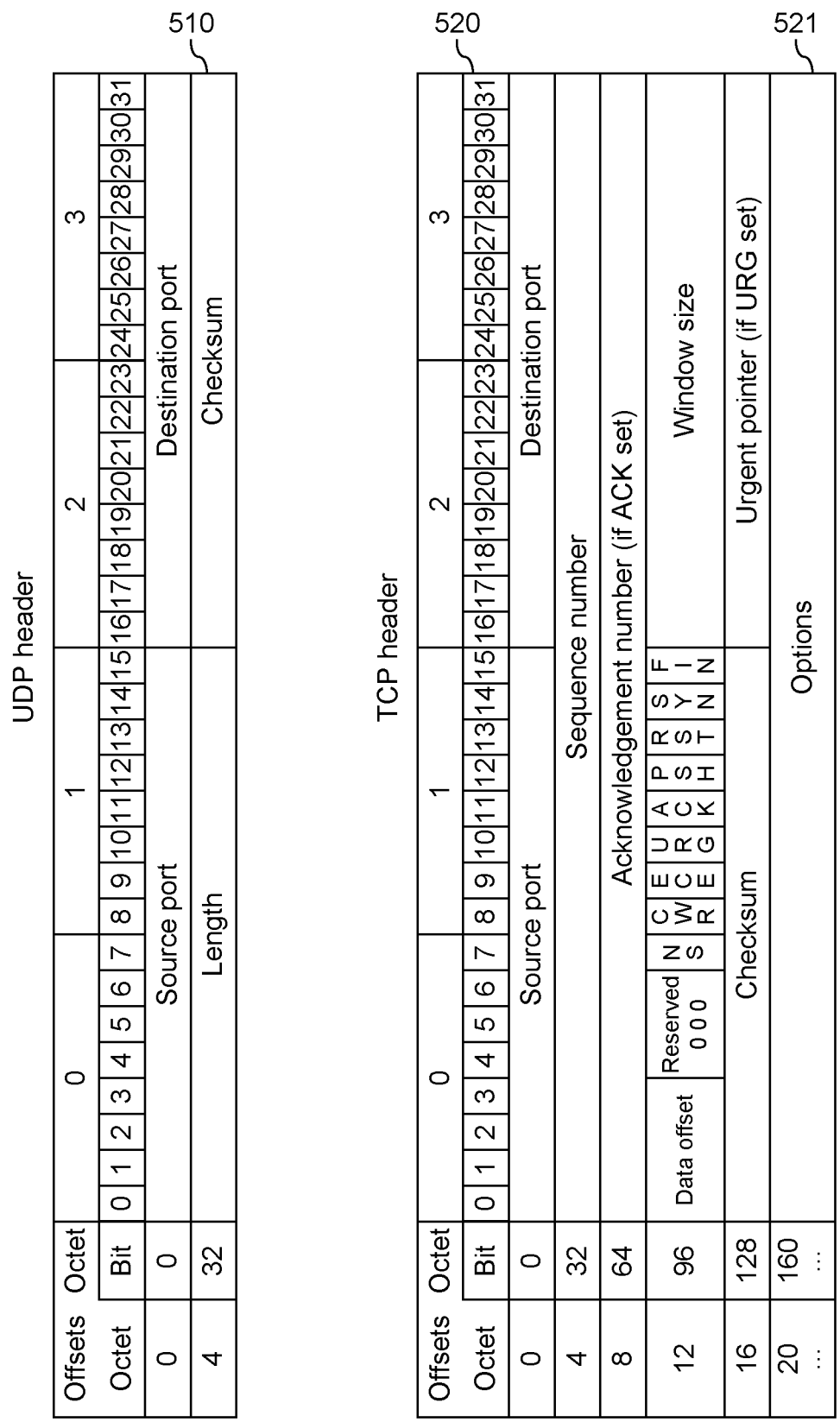
FIG. 5 shows the UDP header and the TCP header, in accordance with embodiments of the invention.

Further with reference to FIG. 3, in response to receiving request 301 or 302, MPTCP client 102 initiates establishing the MPTCP connection by setting up a first MPTCP subflow as a first TCP connection 112 between MPTCP client 102 and MPTCP server 103 over one of the available access networks 122 and 123, in this case DSL network 122. Setting up the first subflow is similar to setting up a regular TCP connection and involves a three-way handshake 311-313, as is known in the art. First, MPTCP client 102 sends a TCP SYN packet 311 to MPTCP server 102, which responds with a TCP SYN/ACK 312 packet. Subsequently, MPTCP client 102 transmits an ACK packet 313 to MPTCP server 103. In addition to the information which is carried in the IP header and the TCP header of each packet, in particular source IP address/port number and destination IP address/port number, the SYN 311, SYN/ACK 312, and ACK 313, packets which are exchanged between MPTCP client 102 and MPTCP server 103 during the three-way handshake also carry additional information indicating that MPCTCP client 102 is MPTCP capable. This additional information is carried as an MPTCP Option "MP_CAPABLE" in the "Options" field 521 of the TCP header 520 shown in FIG. 5.

More specifically, since MPTCP is designed as an extension to standard TCP, a number of MPTCP Options are defined in RFC 6824 in order to provide the additional functionality offered by MPTCP. These MPTCP Options may be used for the purpose of signaling MPTCP operations. All MPTCP operations are signaled as variable-length options using the optional Options field 521 of TCP header 520 (herein referred to as MPTCP Options). TCP Options field 521 has a defined format which comprises a "Kind" information field, a "Length" information field, a "Subtype"

information field, and a field for subtype-specific data. The Internet Assigned Numbers Authority (IANA) has reserved TCP Options Kind "30" for all MPTCP operations. Individual MPTCP messages are identified by a "Subtype", a four-bit field, the values of which are listed in a sub-registry entitled "MPTCP Option Subtypes" under the "Transmission Control Protocol (TCP) Parameters" registry maintained by the IANA. The currently defined Subtypes are as follows:

| Value | Symbol | Name |
| --- | --- | --- |
| 0 x 0 | MP_CAPABLE | Multipath Capable |
| 0 x 1 | MP_JOIN | Join Connection |
| 0 x 2 | DSS | Data Sequence Signal (Data ACK and data sequence mapping) |
| 0 x 3 | ADD_ADDR | Add Address |
| 0 x 4 | REMOVE_ADDR | Remove Address |
| 0 x 5 | MP_PRIO | Change Subflow Priority |
| 0 x 6 | MP_FAIL | Fallback |
| 0 x 7 | MP_FASTCLOSE | Fast Close |
| 0 x f | (PRIVATE) | Private Use within controlled testbeds |

Values 0x8 through 0xe are currently unassigned. Details about MPTCP operations and MPTCP Options can be found in RFC 6824.

Further with reference to FIG. 3, if additional paths are available between MPTCP client 102 and MPTCP server 103, such as via cellular access network 123, additional TCP connections may be are created as subflows on these paths and combined with an existing subflow or subflows. The combined subflows appear as a single end-to-end TCP connection to the applications at both ends, i.e., UDP/TCP client 101 and UDP/TCP server 104. For instance, in the scenario depicted in FIG. 1, a second TCP connection 113 may be established as a second MPTCP subflow, utilizing a path through cellular access network 123, and combined with the first subflow over TCP connection 112.

Establishing an additional TCP connection for use as additional MPTCP subflows is similar to initiating a normal TCP connection, but requires a four-way handshake 341-344 which is illustrated in FIG. 3. In addition to the three-way handshake which is known from conventional TCP, i.e., sending a SYN packet 341 from MPTCP client 102 to MPTCP server 103, sending a SYN/ACK packet 342 from MPTCP server 103 to MPTCP client 102, and sending an ACK packet 343 from MPTCP client 102 to MPTCP server 103, an additional ACK packet 344 is sent from MPTCP client 102 to MPTCP server 103. All TCP packets 341-344 which are sent during the four-way handshake carry additional information in the TCP Options field 521 of their TCP header 520 for identifying TCP connection 113 as an additional MPTCP subflow which should be combined into an MPTCP connection at both MPTCP client 102 and MPTCP server 103. This is achieved by including MPTCP Option "MP_JOIN" in TCP Options 521. It is noted that setting up and combining additional TCP connections with already existing subflows may require keys which are exchanged during a handshake procedure, as is described in RFC 6824.

After the first subflow, via TCP connection 112, has been established, transport of TCP packets from UDP/TCP client 101 to UDP/TCP server 104 (upstreams) and vice versa, from UDP/TCP server 104 to UDP/TCP client 101 (downstreams), may commence via the MPTCP connection between MPTCP client 102 and MPTCP server 103. If second TCP connection 113 as a second subflow has been successfully established and combined with the first MPTCP subflow via first TCP connection 112 at both MPTCP client 102 and MPTCP server 103, TCP packets may be transported between MPTCP client 102 and MPTCP server 103 via either one of TCP connections 112 and 113. Further subflows may be established, and existing subflows may be released or modified, as is described in RFC 6824.

In addition to establishing the MPTCP connection between MPTCP client 102 and MPTCP server 103, both endpoints 102 and 103 of the MPTCP connection may optionally store or update state information which is maintained during the lifetime of the MPTCP connection. This state information is used to bind the MPTCP connection, i.e., the specific IP addresses and port numbers used for TCP connections 112 and 113 at both endpoints 102 and 103 of the MPTCP connection, with the 4- or 5-tuple of source IP address, source port number, destination IP address, destination port number, and optionally protocol number, of a connection between UDP/TCP client 101 and UDP/TCP server 104 which encompasses the MPTCP connection between MPTCP client 102 and MPTCP server 103.

Further with reference to FIG. 3, transporting UDP packets from UDP/TCP client 101 to UDP/TCP server 104, or vice versa, in plain transport mode via the MPTCP connection between MPTCP client 102 and MPTCP server 103 is described in the following.

Figure 6:
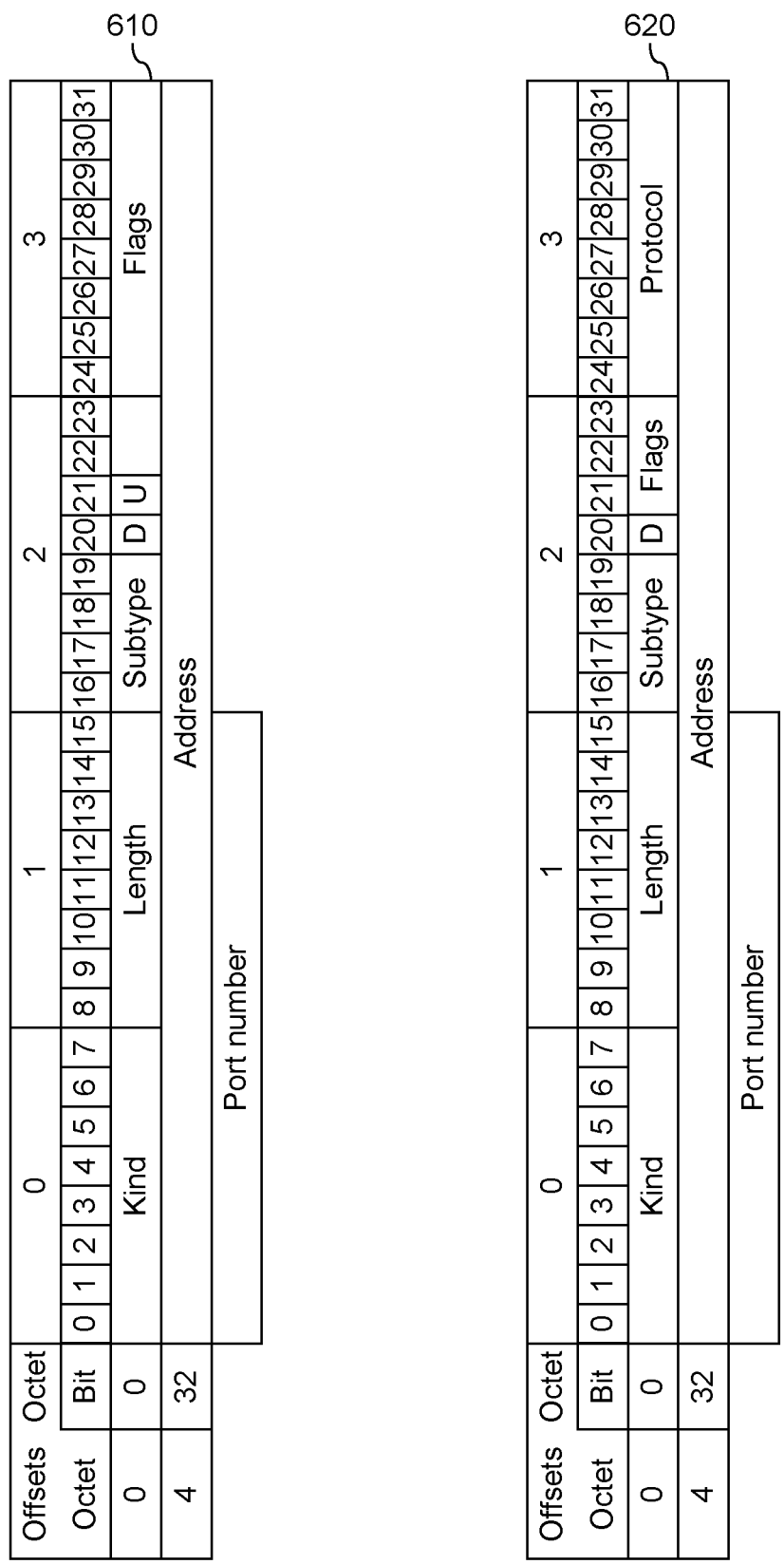
FIG. 6 shows embodiments of the plain transport mode (Plain Mode) MPTCP Option.

As is proposed in draft-boucadair-mptcp-plain-mode-06, an additional MPTCP Option "Plain Mode MPTCP Option" may be used when tunneling UDP packets over an existing MPTCP connection. An exemplifying format 610 of the Plain Mode MPTCP Option is shown in FIG. 6 (reproduced from FIG. 2 of draft-boucadair-mptcp-plain-mode-06). Format 610 is based on the generic format for TCP Options described above, with the "Kind" field set to "30" and the "Subtype" field set to a value to be reserved for the Plain Mode MPTCP Option. The subtype-specific data for an MPTCP Option 610 of subtype "Plain Mode MPTCP Option" may, e.g., comprise the following information:

Address: Includes a source or destination IP address.
Port: Optional, may be used to carry a source or destination port number.
D-bit (direction bit): This flag indicates whether the included IP address and optional port number reflects the source or destination IP address and port number. When the D-bit is set, the enclosed IP address/port number must be interpreted as the source IP address/port number. When the D-bit is unset, the enclosed IP address/port number must be interpreted as the destination IP address/port number.
U-bit (UDP bit): This flag is used for indicating that the MPTCP connection is used in plain transport mode, i.e., for tunneling UDP packets in TCP packets. If the U-bit is set, plain transport mode is used, as is described in draft-boucadair-mptcp-plain-mode-06.

An alternative format 620 of the Plain Mode MPTCP Option, shown in FIG. 6, is based on an information element "Protocol" rather than the U-bit used in format 610. In Plain Mode MPTCP Option 620, "Protocol" conveys the protocol number which is associated with packets which are tunneled in TCP packets over the MPTCP connection. Different values for Protocol may be assigned by IANA. For example, the Protocol field may be set to "17" for UDP traffic, or "6" for TCP traffic.

By utilizing the above described Plain Mode MPTCP Option 610 or 620, UDP packets which are transmitted over a network path encompassing the MPTCP connection between MPTCP client 102 and MPTCP server 103, can be tunneled inside TCP packets over the MPTCP connection. This may, e.g., be achieved by including Plain Mode MPTCP Option 610 or 620 in TCP SYN packet 311 which initiates the three-way handshake 311-313 for establishing the first MPTCP subflow as first TCP connection 112.

More specifically, in TCP SYN packet 311 carrying Plain Mode MPTCP Option 610 ("MP_PLAIN" in FIG. 3), the U-bit is set to "1" to indicate plain transport mode, and a destination IP address is copied into the Address field of Plain Mode MPTCP Option 610. Alternatively, if TCP SYN packet 311 carries Plain Mode MPTCP Option 620, the Protocol field is set to a value indicating UDP traffic, e.g., "17". Similar to Plain Mode MPTCP Option 610, a destination IP address is copied into the Address field of Plain Mode MPTCP Option 620. The destination IP address which is copied into the Address field of Plain Mode MPTCP Option 610 or 620 may, e.g., be received with request 302 for establishing an MPTCP connection. For instance, this may be the IP address of a network node providing a specific service, such as a streaming service. Subsequently, UDP packets 331/351 which are received from UDP/TCP client 101, are tunneled inside TCP packets 333/353 over the existing MPTCP connection if the destination IP address carried in UDP packets 331/351 matches the destination IP address which was conveyed from MPTCP client 102 to MPTCP server 103 in TCP SYN packet 311, i.e., the destination address for which the MPTCP connection was established. The destination IP address is advantageously stored as state information at both endpoints 102 and 103 of the MPTCP connection, binding the MPTCP connection to a UDP flow.

Further with reference to FIG. 3, one or more UDP packets 331/351 may be received from UDP/TCP client 101, or from a higher layer of the protocol stack, in particular from an application acting as UDP client, for upstream transport to UDP/TCP server 104. In response to receiving UDP packets 331/351, MPTCP client 102 transforms 332/352 the received UDP packets 331/351 into TCP packets 333/353 which subsequently are transmitted to MPTCP server 103. The received UDP packets 331/351 are transformed 332/352 into TCP packets 333/353 by replacing the headers 510 of the received UDP packets 331/351 with TCP headers 520. More specifically, if a binding entry is found in the state information maintained by MPTCP client 102 which matches the 5-tupel of UDP packets 333/353, the information in the binding entry is used. Otherwise, i.e., if no binding entry is found, a new MPTCP connection is established before forwarding UDP packets 331/353, and the corresponding state information is stored. The new MPTCP connection is established as is described hereinbefore, i.e., by means of three-way handshake 311-313 with Plain Mode MPTC Option 610 or 620 carried in TCP SYN packet 311.

In response to the receiving one or more TCP packets 333/353 from MPTCP client 102, MPTCP server 103 transforms 334/354 the received TCP packets 333/353 into UDP packets 335/355, and forwards the UDP packets 335/355 to their destination, e.g., UDP/TCP server 104. The received TCP packets 333/353 are identified as being plain-transport-mode packets based on the state information maintained by MPTCP server 103. In addition, the destination of the packets is determined based on the state information. More specifically, if a matching binding entry is found in the state information maintained by MPTCP server 103, the information in the binding entry is used. TCP packets 333/353 are transformed 334/354 into UDP packets 335/355 by replacing the headers 520 of the received TCP packets 333/353 with UDP headers 510.

The downstream transport of UDP packets from UDP/TCP server 104 to UDP/TCP client 101 is also illustrated in FIG. 3. One or more UDP packets 361 may be received from UDP/TCP server 104 for downstream transport to UDP/TCP client 101, or to a higher layer of the protocol stack, in particular to an application acting as UDP client. In response to receiving UDP packets 361, MPTCP server 104 transforms 362 the received UDP packets 361 into TCP packets 363 which subsequently are transmitted to MPTCP client 102. The received UDP packets 361 are transformed 362 into TCP packets 363 by replacing the headers 510 of the received UDP packets 361 with TCP headers 520, based on state information maintained at MPTCP server 103.

In response to the receiving one or more TCP packets 363 from MPTCP server 103, MPTCP client 102 transforms 364 the received TCP packets 363 into UDP packets 365 before forwarding them to their original destination, e.g., UDP/TCP client 101. The received TCP packets 363 are identified as being plain-transport-mode packets based on the state information maintained by MPTCP client 102. In addition, the destination of the packets is determined based on the state information. The received TCP packets 363 are transformed 364 into UDP packets 365 by replacing the header 520 of the received TCP packet 363 with a UDP header 510.

Figure 4:
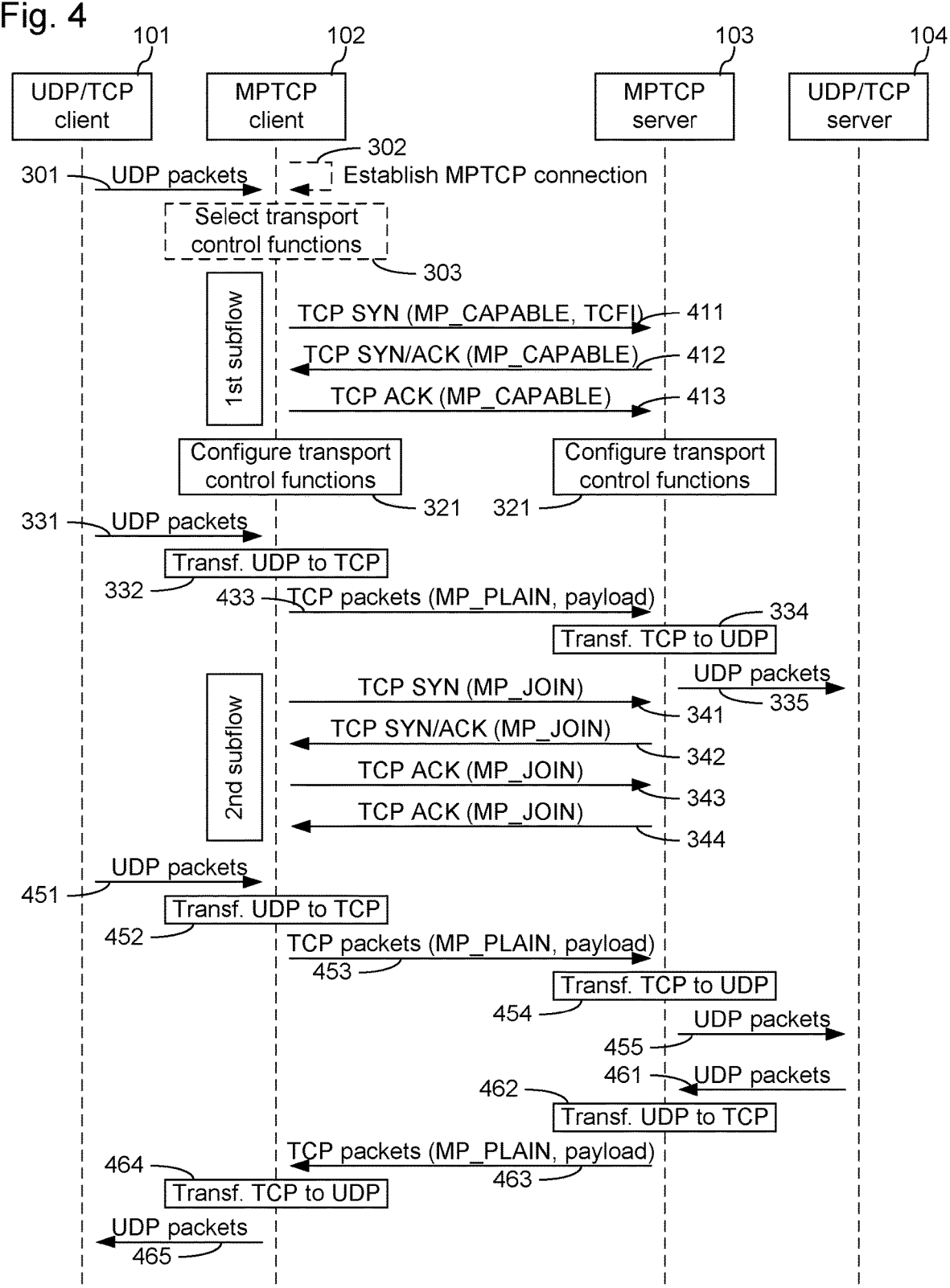
FIG. 4 illustrates transporting UDP packets over an MPTCP connection, in accordance with another embodiment of the invention.

In FIG. 4, an alternative embodiment of transporting UDP packets between UDP/TCP client 101 and UDP/TCP server 104, and vice versa, via an MPTCP connection between MPTCP client 102 and MPTCP server 103, is illustrated. Unless noted, arguments provided with reference to FIG. 3 are also applicable to FIG. 4.

The embodiment shown in FIG. 4 differs from that of FIG. 3 in that Plain Mode MPTCP Option 610 or 620 ("MP_PLAIN" in FIG. 4) is included in each TCP packet carrying UDP payload which is transmitted between MPTCP client 102 and MPTCP server 103 in plain transport mode, rather than in TCP SYN packet 411 which is transmitted during the three-way handshake 411-413 during establishing first TCP connection 112. This is in contrast to FIG. 3, which illustrates that Plain Mode MPTCP Option 610 or 620 is carried in TCP SYN packet 311.

To this end, in each TCP packet carrying UDP payload, the U-bit in Plain Mode MPTCP Option 610 is set to "1" to indicate plain transport mode. Alternatively, plain transport mode may be indicated by setting the Protocol field in Plain Mode MPTCP Option 620 to a value which is reserved for UDP traffic, e.g., "17". In addition, the original destination IP address contained in the UDP packet is copied into the Address field of Plain Mode MPTCP Option 610 or 620. This is in contrast to the embodiment described with reference to FIG. 3, in which the endpoints of the MPTCP connection, i.e., MPTCP client 102 and MPTCP server 103 need to maintain state information for associating the MPTCP connection with the 4-tuple of source/destination IP address/port number identifying the flow of UDP traffic between UDP/TCP client 101 and UDP/TCP server 104.

More specifically, with reference to FIG. 4, one or more UDP packets 431/451 may be received from UDP/TCP client 101, or from a higher layer of the protocol stack, in particular from an application acting as UDP client, for upstream transport to UDP/TCP server 104. In response to receiving UDP packets 431/451, MPTCP client 102 transforms 432/452 the received UDP packets 431/451 into TCP packets 433/453 which subsequently are transmitted to MPTCP server 103. The received UDP packets 431/451 are transformed 432/452 into TCP packets 433/453 by replacing the headers 510 of the received UDP packets 4/451 with TCP headers 520, and inserting information into each TCP header which identifies the TCP packets 433/453 as plain-mode-transport packets, i.e., TCP packets with UDP payload. The information may, e.g., be the Plain Mode MPTCP Option 610 with the U-bit set, or Plain Mode MPTCP Option 620 with the Protocol field set to a value which is reserved for UDP traffic, e.g., "17", to indicate plain mode transport. In addition, the original IP destination address which is contained in the IP header of each UDP packet 431/451 is copied into the address field of Plain Mode MPTCP Option 610 or 620 of the corresponding TCP packet 433/453, with the D-bit set to indicate that the address in the address field is a destination IP address (the format of IP headers is well known in the art and not illustrated in the figures).

In response to the receiving one or more TCP packets 433/453 from MPTCP client 102, MPTCP server 103 transforms 434/454 the received TCP packets 433/453 into UDP packets 435/455, and forwards the UDP packets 435/455 to their destination, e.g., UDP/TCP server 104. The destination of the packets is identified by the original IP destination address which is included in the address field of Plain Mode MPTCP Option 610 or 620 contained in TCP packets 433/453 received in plain transport mode from MPTCP client 102. The received TCP packets 433/453 are transformed 434/454 into UDP packets 435/455 by detecting information comprised in the header 420 of each received TCP packet 433/453 which identifies the TCP packet as plain-mode-transport packet, i.e., carrying UDP payload, and replacing the headers 520 of the received TCP packets 433/453 with UDP headers 510. The information identifying the TCP packets as plain-mode-transport packets may be the set U-bit in Plain Mode MPTCP Option 610, or Plain Mode MPTCP Option 620 with the Protocol field set to a value which is reserved for UDP traffic, e.g., "17". In addition, the address comprised in the address field of Plain Mode MPTCP Option 610 or 620 is copied into the destination IP address field of the IP header of UDP packets 435/455 before they are forwarded to their destination.

Further with reference to FIG. 4, one or more UDP packets 461 may be received from UDP/TCP server 104 for downstream transport to UDP/TCP client 101, or to a higher layer of the protocol stack, in particular to an application acting as UDP client. In response to receiving UDP packets 461, MPTCP server 104 transforms 462 the received UDP packets 461 into TCP packets 463 which subsequently are transmitted to MPTCP client 102. The received UDP packets 461 are transformed 462 into TCP packets 463 by replacing the headers 510 of the received UDP packets 461 with TCP headers 520, and inserting information into each TCP header for identifying TCP packets 463 as plain-mode-transport packets, i.e., carrying UDP payload. The information identifying TCP packets 463 as plain-mode-transport packets may, e.g., be the Plain Mode MPTCP Option 610 with the U-bit set, or Plain Mode MPTCP Option 620 with the Protocol field set to a value which is reserved for UDP traffic, e.g., "17". In addition, the original IP source address which was contained in the IP header of each UDP packet 461 is copied into the address field in Plain Mode MPTCP Option 610 or 620 of the corresponding TCP packet 463, with the D-bit unset to indicate that the address is a source IP address.

In response to receiving one or more TCP packets 463 from MPTCP server 103, MPTCP client 102 transforms 464 the received TCP packets 463 into UDP packets 465 before forwarding them to their original destination, e.g., UDP/TCP client 101, as identified by the original IP destination address which is included in the address field of Plain Mode MPTCP Option 610 or 620 carried in each TCP packet 463 which is received from MPTCP server 103 in plain transport mode. The received TCP packets 463 are transformed 464 into UDP packets 465 by detecting information comprised in a header 520 of each received TCP packet 463 which identifies the TCP packet as plain-mode-transport packet, and replacing the header 520 of the received TCP packet 463 with a UDP header 510. The information identifying the TCP packet as a plain-transport-node packet may be the set U-bit in Plain Mode MPTCP Option 610, or Plain Mode MPTCP Option 620 with the Protocol field set to a value which is reserved for UDP traffic, e.g., "17". In addition, the address comprised in the address field of Plain Mode MPTCP Option 610 or 620 is copied into the source IP address field of the IP header of UDP packets 465 before forwarding them to their destination, UDP/TCP client 101.

Further with reference to FIGS. 3 and 4, embodiments of the invention convey additional information between MPTCP client 102 and MPTCP server 103 for identifying one or more transport control functions, also known as TCP functions, which are to be applied to UDP packets which are transported over the MPTCP connection, either upstreams (331-335 and 351-355 in FIGS. 3, 431-435 and 451-455 in FIG. 4) or downstreams (361-365 in FIG. 3,461-465 in FIG. 4).

For the embodiment described with reference to FIG. 3, the information identifying the one or more transport control functions ("TCFI" in FIGS. 3 and 4) may, e.g., be carried in the Plain Mode MPTCP Option 610 or 620 carried in TCP SYN packet 311. For instance, this may be achieved by utilizing the "Flags" field, which is a sequence of eight (Plain Mode MPTCP Option format 610) or three (Plain Mode MPTCP Option format 620) bits reserved for future use, such that each bit corresponds to a certain transport control function of a list of transport control functions, and wherein the value of each bit, i.e., "0" or "1", indicates whether the corresponding transport control function is to be applied to UDP packets or not. Thereby, it is possible to convey information about eight (Plain Mode MPTCP Option format 610) or three (Plain Mode MPTCP Option format 620) distinct transport control functions between MPTCP client 102 and MPTCP server 103. As an alternative, the Flags field may carry a list of values, wherein each value is coded as a number of bits and represents a certain transport control function of the list of transport control functions which is to be applied to UDP packets. For instance, for Plain Mode MPTCP Option format 610 one may envisage that two bits are used for each transport control function, thereby allowing MPTCP client 102 to transmit a list comprising up to four transport control functions (four values, each value being coded with two bits, resulting in a total of eight bits), wherein each pair of bits represents one out of four distinct transport control functions (two bits can be used to encode four distinct values, e.g., 0, 1, 2, and 3).

As an alternative to carrying the information identifying one or more transport control functions in Plain Mode MPTCP Option 610 or 620, embodiments of the invention may be envisaged which utilize a new MPTCP Option subtype, e.g., "MP_TCFI", for conveying information identifying one or more transport control functions. The subtype-specific data for the new MP_TCFI subtype may be defined in numerous ways suitable for conveying information identifying a list of transport control functions which are to be applied to UDP packets, i.e., in plain transport mode. For instance, the subtype-specific data may comprise a sequence of bits, wherein each bit corresponds to a certain transport control function of a list of transport control functions, and wherein the value of a certain bit, i.e., "0" or "1", indicates whether the corresponding transport control function is to be applied to UDP packets in plain transport mode or not.

Alternatively, the sequence of bits may carry a list of values, wherein each value is coded as a number of bits and represents a certain transport control function of the list of transport control functions which is to be applied to UDP packets in plain transport mode. Such a new MPTCP Option subtype may advantageously be used for transmitting the information identifying one or more transport control functions from MPTCP client 102 to MPTCP server 103 in embodiments of the invention which are based on FIG. 4, i.e., when Plain Mode MPTCP Option 610 or 620 is carried in each TCP packet. In such case, the new MPTCP Option subtype for carrying information identifying one or more transport control functions may be included in TCP SYN packet 411 which is transmitted ruing the three-way handshake 411-413.

As yet a further alternative, the information identifying one or more transport control functions may be conveyed in an IP header. For instance, in an IPv4 header, the information identifying the one or more the transport control functions may be conveyed in the "Options" field of the IP header in a manner similar to what has been described with respect to MPTCP Options carried in TCP headers. In an IPv6 header, the information identifying the one or more the transport control functions may be conveyed in one or more extension headers. Even further, the information identifying one or more transport control functions may alternatively be carried as payload in a TCP packet which is transmitted from MPTCP client 102 to MPTCP server 103 after the MPTCP connection, or at least one subflow, has been established.

It will be appreciated that the signaling of the information identifying one or more the transport control functions in accordance with embodiments of the invention requires both endpoints 102 and 103 of the MPTCP connection to use a common way of encoding the information.

It will be appreciated that embodiments of the invention may be based on alternative ways of conveying information identifying the one or more transport control functions between MPTCP client 102 and MPTCP server 103. For instance, with reference to FIG. 3, MPTCP client 102 may transmit the information identifying the one or more transport control functions to the MPTCP server 103 in a the TCP SYN packet which is transmitted during establishing an additional subflow, e.g., in TCP SYN packet 341. As a further alternative, the information may be transmitted in any other TCP packet transmitted from MPTCP client 102 to MPTCP server 103, either during setup of the first subflow (e.g., in TCP ACK 313), during setup of an addition subflow, e.g., the second subflow (TCP SYN 341 or TCP ACK 343), or as a separate TCP packet which is transmitted from MPTCP client 102 to MPTCP server 103 after a TCP connection has been established. For instance, the set of transport control functions which are to be applied in plain transport mode may be changed during the lifetime of an MPTCP connection by simply sending the information identifying one or more transport control functions, i.e., TCFI, in a TCP packet to the other endpoint of the MPTCP connection, either as TCP Option in the header of the TCP packet, as payload, or in the corresponding IP header.

After the information identifying the one or more transport control functions has been exchanged between the two endpoints of the MPTCP connection, MPTCP client 102 and MPTCP server 103, both endpoints apply the one or more transport control functions to UDP packets which are transported over the MPTCP connection. This may, e.g., be achieved by configuring 321 MPTCP client 102 and MPTCP server 103 for applying the selected transport control functions to UDP packets, e.g., by effecting corresponding settings so as to activate one or more software modules and/or hardware modules implementing the one or more transport control functions. Preferably, the transport control functions are applied to UDP packets transported upstreams, i.e., from UDP/TCP client 101 to UDP/TCP server 104, as well as downstreams, i.e., from UDP/TCP server 104 to UDP/TCP client 101. As an example, if MPTCP client 102 and MPTCP server 103 are both configured to apply a transport control function like ordered transmission, or in-order transmission, which is known from TCP, MPTCP server 103 may buffer TCP packets 333/353/433/453 which are received in plain transport mode from MPTCP client 102 before forwarding them in correct order. As was described earlier, this is advantageous in that a difference in RTT between two disjoint network paths 112 and 113 which are part of the MPTCP connection may result in an increased fraction of UDP packets which are delivered out-of-order, as compared to a UDP connection which is not carried over MPTCP. Note that UDP does not provide in-order delivery, as TCP, and the correct sequence of packets needs to be established at the application level. To this end, MPTCP client 102 may buffer TCP packets 363/463 which are received in plain transport mode from MPTCP server 103 before forwarding them in correct order, i.e., in accordance with sequence numbers provided in TCP packets 363/463, to UDP/TCP client 101. The sequence numbers which are utilized for in-order deliver of UDP packets over the MPTCP connection are MPTCP-specific subflow sequence numbers which are separate from the connection-level sequence numbers known from TCP, and which are visible to TCP client 101 and TCP server 104 as endpoints of a TCP connection.

As a further example, MPTCP client 102 and MPTCP server may both be configured to apply retransmission of lost packets, similar to what is known from TCP. For instance, when MPTCP server 103 sends TCP packets 363/463 to MPTCP client 103, a copy of the transmitted data is retained until MPTCP client 102 has acknowledged that TCP packets 363/463 have been received. In the event that MPTCP client 102 does not acknowledge reception of TCP packets 363/463, the unacknowledged packets are retransmitted. For instance, this may be achieved by means of a timer at MPTCP server 103 which triggers retransmission of packets which have not been acknowledged within the time interval dictated by the timer.

The one or more transport control functions which are applied to UDP packets which are transported over the MPTCP connection may optionally be selected 303 by MPTCP client 102. For instance, MPTCP client 102 may select 303 the one or more transport control functions in response to receiving the request 301 or 302 for establishing an MPTCP connection for transporting UDP packets, and based on information comprised therein. Request 301 may be received from an application acting as UDP client and which optionally may be executed in a client device comprising MPTCP client 102. In this case, the application may request a set of transport control functions which are suitable for the service utilizing UDP. Alternatively, if request 301 is a UDP packet which is received from UDP/TCP client 101, the one or more transport control functions may be selected based on the service, or type of service, relying on UDP. For instance, the one or more transport control functions may be selected based on the 4-tupel of source/destination IP address/port number. In the alternative scenario if request 302 is received as configuration information from a network node of an ISP when a residential gateway comprising MPTCP client 102 attempts to connect to the ISP's network during startup, the setup of static MPTCP connections for use in plain transport mode, and the set of transport control functions which are to be applied to UDP packets, is typically decided by the ISP.

It will be appreciated that the one or more transport control functions which are selected for plain transport mode are not limited to the known TCP functions such as in-order/ordered transfer, retransmission of lost packets, flow control, and congestion control, but may include other transport control functions which are suitable for UDP.

In the following, embodiments of MPTCP client 102, MPTCP server 103, or an MPTCP proxy comprising both MPTCP client 102 and MPTCP server 103, for transporting UDP packets over an MPTCP connection are described with reference to FIGS. 7 to 9. For the sake of simplicity, the following discussion is limited to embodiments of the MPTCP proxy, but it will be appreciated that corresponding argumentation applies to embodiments of MPTCP client 102 and MPTCP server 103, respectively. Advantageously, an embodiment of the MPTCP proxy may be deployed at a client-side location in the network (e.g., at the location of MPTCP client 102), at a server-side location in the network (e.g., at the location of MPTCP server 103), or at both locations.

Figure 7:
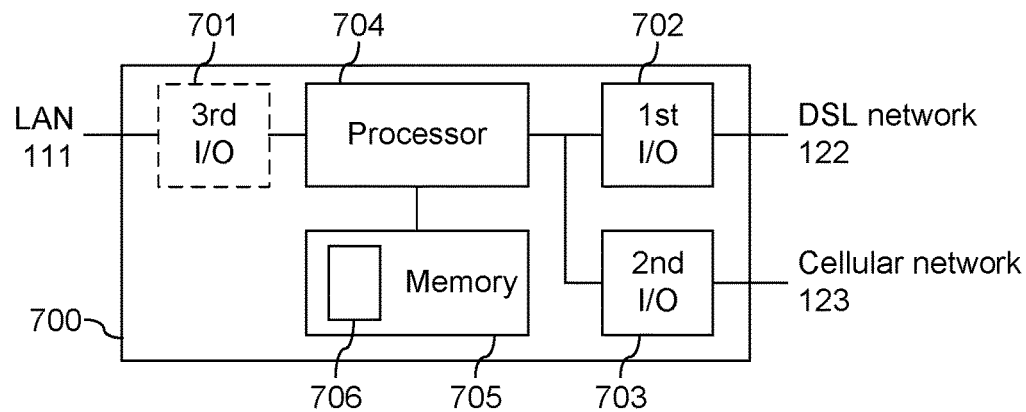
FIG. 7 shows an embodiment of an MPTCP client, an MPTCP server, or an MPTCP proxy, for transporting UDP packets over an MPTCP connection.

In FIG. 7, an embodiment 700 of the MPTCP proxy is illustrated as comprising a first network interface 701, a second network interface 702, an optional third network interface 703, a processor 704, and a memory 705. First network interface 701 and second network interface 702 are operative for communicating by means of TCP via a respective access network, e.g., with another MPTCP proxy 700. For instance, first network interface 701 may be operative for communicating over a wired access network, such as a DSL network 122, and second network interface 702 may be operative for communicating over a wireless access network, such as cellular access network 123. Optional third network interface 703 may be operative for communicating with UDP/TCP client 101 over LAN 111, e.g., a WLAN/WiFi access network, or with UDP/TCP server 104 over a WAN 114, e.g., the Internet. Processor 704 may, e.g., be a general purpose processor which is operative to perform embodiments of the invention described with reference to MPTCP client 102, MPTCP server 103, or both, when executing instructions 706, i.e., a computer program, comprised in memory 705. Memory 705 may be a Random Access Memory (RAM), a Read-Only Memory (ROM), a Flash memory, a Hard-Disk Drive (HDD), or any other type of computer-readable data storage.

In particular, if MPTCP proxy 700 implements MPTCP client 102, when instructions 706 are executed by processor 704, MPTCP proxy 700 becomes operative to receive a request for establishing an MPTCP connection for transporting UDP packets between the MPTCP client and an MPTCP server, establish the MPTCP connection, wherein information identifying one or more transport control functions is transmitted to the MPTCP server during establishing the MPTCP connection, which transport control functions are to be applied to UDP packets which are transported over the MPTCP connection, and apply the one or more transport control functions to UDP packets which are transported over the MPTCP connection. Optionally, MPTCP proxy 700 may further be operative to establish the MPTCP connection by establishing at least one TCP connection as an MPTCP subflow between the MPTCP client 102 and the MPTCP server 103, wherein the information identifying the one or more selected transport control functions is transmitted as a TCP Option in a TCP SYN packet which is transmitted during establishing one of the at least one TCP connection. Optionally, MPTCP proxy 700 may further be operative to select the one or more transport control functions. Preferably, the one or more transport control functions are selected based on information comprised in the request for establishing an MPTCP connection for transporting UDP packets. Optionally, the request for establishing an MPTCP connection is a UDP packet received from a UDP client.

Further, if MPTCP proxy 700 implements MPTCP server 103, when instructions 706 are executed by processor 704, MPTCP proxy 700 becomes operative to receive from an MPTCP client, during establishing an MPTCP connection with the MPTCP client, information identifying one or more transport control functions which are to be applied to UDP packets which are transported over the MPTCP connection, and apply the one or more transport control functions to UDP packets which are transported over the MPTCP connection. Optionally, MPTCP proxy 700 may further be operative to establish the MPTCP connection by establishing at least one TCP connection as an MPTCP subflow between the MPTCP client and the MPTCP server, wherein the information identifying the one or more selected transport control functions is received as a TCP Option in a TCP SYN packet which is received during establishing one of the at least one TCP connection. It will be appreciated that processor 704 may further be operative to perform alternative or additional functionality, in accordance with embodiments of the invention as described herein.

Figure 8:
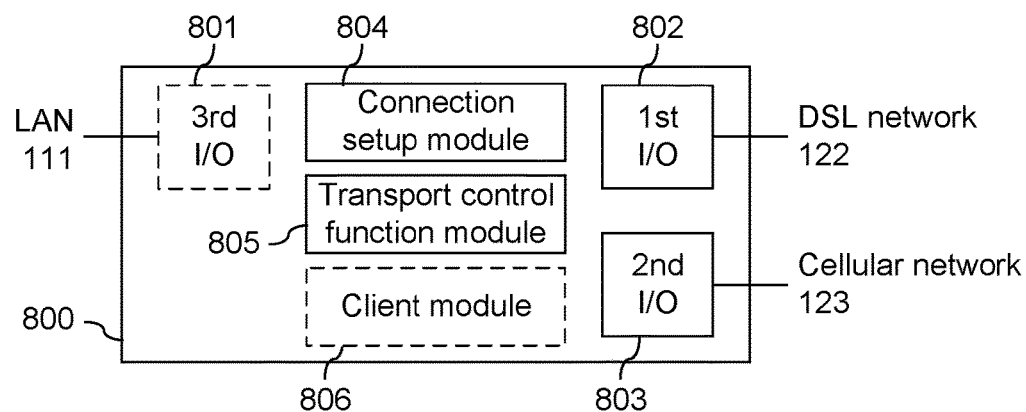
FIG. 8 shows another embodiment of an MPTCP client, an MPTCP server, or an MPTCP proxy, for transporting UDP packets over an MPTCP connection.

In FIG. 8, another embodiment 800 of the MPTCP proxy is illustrated as comprising a first network interface 801, a second network interface 802, an optional third network interface 803, a connection setup module 804, and a transport control function module 805. Network interfaces 801-803 are similar to network interfaces 601-603, respectively, described with reference to FIG. 7. Connection setup module 804 and transport control function module 805 are operative to perform embodiments of the invention described with reference to MPTCP client 102, MPTCP server 103, or both.

In particular, if MPTCP proxy 800 implements MPTCP client 102, connection setup module 804 is operative to receive a request for establishing an MPTCP connection for transporting UDP packets between the MPTCP client and an MPTCP server and establish the MPTCP connection, wherein information identifying one or more transport control functions is transmitted to the MPTCP server during establishing the MPTCP connection, which transport control functions are to be applied to UDP packets which are transported over the MPTCP connection. Transport control function module 805 is operative to apply the one or more transport control functions to UDP packets which are transported over the MPTCP connection. Optionally, connection setup module 804 may further be operative to establish the MPTCP connection by establishing at least one TCP connection as an MPTCP subflow between the MPTCP client and the MPTCP server, wherein the information identifying the one or more selected transport control functions is transmitted as a TCP Option in a TCP SYN packet which is transmitted during establishing one of the at least one TCP connection. Optionally, transport control function module 805 may further be operative to select the one or more transport control functions. Preferably, the one or more transport control functions are selected based on information comprised in the request for establishing an MPTCP connection for transporting UDP packets. Optionally, the request for establishing an MPTCP connection is a UDP packet received from a UDP client.

Further, if MPTCP proxy 800 implements MPTCP server 103, connection setup module 804 is operative to receive from an MPTCP client, during establishing an MPTCP connection with the MPTCP client, information identifying one or more transport control functions which are to be applied to UDP packets which are transported over the MPTCP connection. Transport control function module 805 is operative to apply the one or more transport control functions to UDP packets which are transported over the MPTCP connection. Optionally, connection setup module 804 may further be operative to establish the MPTCP connection by establishing at least one TCP connection as an MPTCP subflow between the MPTCP client and the MPTCP server, wherein the information identifying the one or more selected transport control functions is received as a TCP Option in a TCP SYN packet which is received during establishing one of the at least one TCP connection. It will be appreciated that connection setup module 804 and transport control function module 805, as well as any additional modules which MPTCP proxy 800 may comprise, may further be operative to perform alternative or additional functionality, in accordance with embodiments of the invention as described herein.

Figure 9:
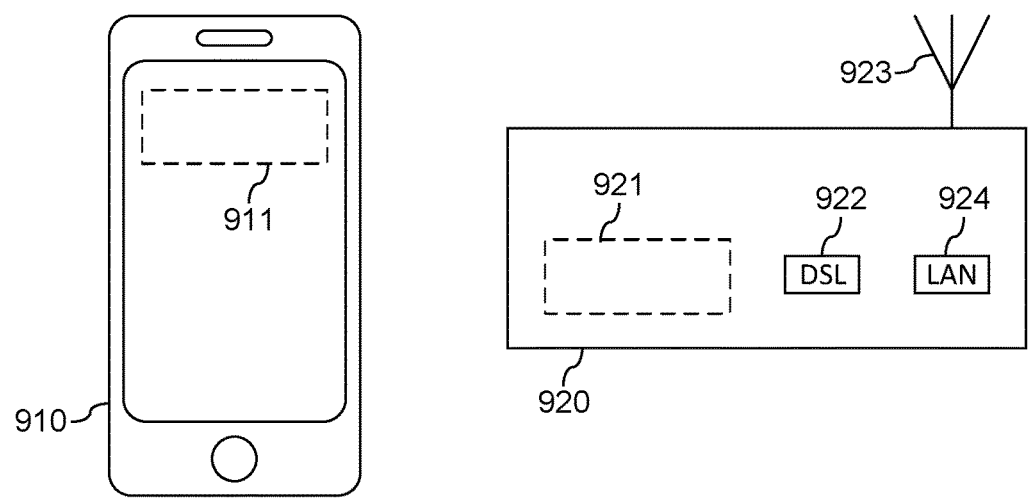
FIG. 9 shows further embodiments of the MPTCP client, the MPTCP server, or the MPTCP proxy.

For instance, an embodiment 911 of MPTCP proxy 700 or 800 may be comprised in a client device, such as a mobile terminal 910 shown in FIG. 9. In this case, an application (layer 221 of MPTCP stack 220) communicating with UDP/TCP server 104 by means of UDP may act as UDP client, i.e., TCP/UDP client 101. Mobile terminal 910 may, e.g., be a UE, a mobile phone, a smartphone, a tablet, a laptop, a media player, or the like. The application acting as UDP client may either be implemented by means of instructions 706 to be executed by processor 704, i.e., as a computer program, or provided as a client module 806. First network interface 701/801 and second network interface 702/802 may, e.g., be a cellular radio access module and a WLAN/WiFi module comprised in mobile terminal 910 (not shown in FIG. 9).

Alternatively, an embodiment 921 of MPTCP proxy 700 or 800 may be provided separate from a UDP client (UDP/TCP client 101) or a UDP server (UDP/TCP server 104), e.g., as client-side residential gateway 920 (at the location of MPTCP client 102) or as a network-side proxy server (at the location of MPTCP server 103). In the case of residential gateway 920, first network interface 701/801 may, e.g., be a DSL module which is operative for communicating over a DSL network, via DSL connector 922, and second network interface 702/802 may, e.g., be a cellular radio access module which is operative for communicating over a cellular radio access network, via antenna 923. Third network interface 703/803 may, e.g., be an Ethernet module which is operative for communicating over LAN 111, via connector 924, with UDP/TCP client 101. In case of a network-side proxy server, such as a TCP proxy, a HyperText Transfer Protocol (HTTP) proxy, a traffic shaping proxy, a Concentrator, a CDN edge node, or the like, third network interface 503 may be operative for communicating with UDP/TCP server 104 over WAN 114, e.g., the Internet.

Network interfaces 701-703 and 801-803, modules 804, 805, and 806, as well as any additional modules comprised in MPTCP proxy 800, may be implemented by any kind of electronic circuitry, e.g., any one, or a combination of, analogue electronic circuitry, digital electronic circuitry, and processing means executing a suitable computer program.

It will be appreciated that embodiments 700 and 800 of the MPTCP proxy are not limited to communicating over the types of access networks described in relation to FIGS. 7 and 8, i.e., DSL access networks, WLAN/WiFi access networks, and cellular access network. Rather, embodiments of the invention may be envisaged which utilize any type or types of access networks, including cellular access networks, WLAN/WiFi access networks, and optical networks, which are suitable for use in the context of MPTCP.

Figure 10:
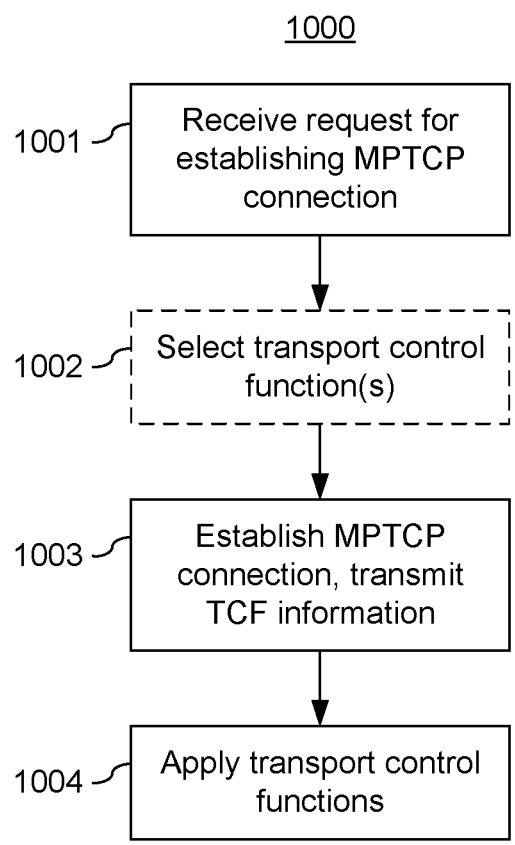
FIG. 10 shows a method of transporting UDP packets over an MPTCP connection, the method being performed by an MPTCP client, in accordance with embodiments of the invention.

In the following, embodiments 1000 of the method of transporting UDP packets over an MPTCP connection, method 1000 being performed by an MPTCP client 102, are described with reference to FIG. 10. Method 1000 comprises receiving 1001 a request for establishing an MPTCP connection for transporting UDP packets between the MPTCP client and an MPTCP server 103, establishing 1003 the MPTCP connection, wherein information identifying one or more transport control functions is transmitted to the MPTCP server during establishing 1003 the MPTCP connection, which transport control functions are to be applied to UDP packets which are transported over the MPTCP connection, and applying 1004 the one or more transport control functions to UDP packets which are transported over the MPTCP connection. Establishing 1003 the MPTCP connection may comprise establishing at least one TCP connection as an MPTCP subflow between the MPTCP client and the MPTCP server, in which case the information identifying the one or more selected transport control functions is transmitted as a TCP Option in a TCP SYN packet which is transmitted during establishing one of the at least one TCP connection. Optionally, method 1000 may further comprise selecting 1002 the one or more transport control functions. The one or more transport control functions may, e.g., be selected based on information comprised in the request for establishing an MPTCP connection for transporting UDP packets. Optionally, the request for establishing an MPTCP connection is a UDP packet received from a UDP client.

Figure 11:
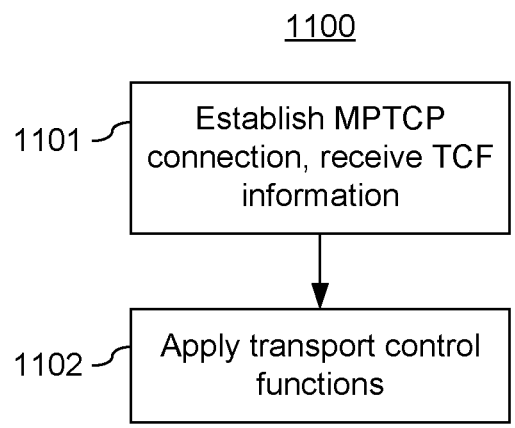
FIG. 11 shows a method of transporting UDP packets over an MPTCP connection, the method being performed by an MPTCP server, in accordance with embodiments of the invention.

In the following, embodiments 1100 of the method of transporting UDP packets over an MPTCP connection, method 1100 being performed by an MPTCP server 103, are described with reference to FIG. 11. Method 1100 comprises receiving, during establishing 1101 an MPTCP connection with an MPTCP client 102, from the MPTCP client information identifying one or more transport control functions which are to be applied to UDP packets which are transported over the MPTCP connection, and applying 1102 the one or more transport control functions to UDP packets which are transported over the MPTCP connection. Establishing 1101 the MPTCP connection may comprise establishing at least one TCP connection as an MPTCP subflow between the MPTCP client and the MPTCP server, and the information identifying the one or more selected transport control functions is received as a TCP Option in a TCP SYN packet which is received during establishing one of the at least one TCP connection.

It will be appreciated that methods 1000 and 1100 may comprise additional, or modified, steps in accordance with what is described throughout this disclosure. Method 1000, method 1100, or both, may be performed by a device which is deployed as a client-side proxy, as a network-side proxy, by a client device acting as UDP client, or by an origin server acting as UDP sever. Embodiment of methods 1000 or 1100 may be implemented as software, such as computer program 706, to be executed by a processing unit comprised in the device, whereby the device is operative to perform in accordance with embodiments of the invention as described herein.

The person skilled in the art realizes that the invention by no means is limited to the embodiments described above. In particular, embodiments of the invention may be envisaged which convey information identifying one or more transport control functions from an MPTCP client to an MPTCP server, which one or more transport control functions are to be applied to TCP packets which are transported between the MPTCP client and the MPTCP server over an MPTCP connection. The MPTCP connection may be established in response to receiving, from a TCP client, a request for establishing a TCP connection with a TCP server. Optionally, the MPTCP client may select the one or more transport control functions, preferably based on information comprised in the received request for establishing a TCP connection. In such a scenario, Plain Mode MPTCP Option 610 or 620 may also be used to convey a destination IP address from MPTCP client 102 to MPTCP server 103, which destination IP address is associated with a TCP connection between UDP/TCP client 101 and UDP/TCP server 104.

The invention claimed is:

1. A Multipath Transmission Control Protocol (MPTCP) client for transporting User Datagram Protocol (UDP) packets, the MPTCP client comprising a processor and a memory storing instructions executed by the processor that cause the MPTC client operative to:
    receive a request for establishing a MPTCP connection between the MPTCP client and a MPTCP server;
    as a result of receiving the request for establishing the MPTCP connection, establish the MPTCP connection, establishing the MPTCP connection comprising establishing (i) a first TCP connection as a first MPTCP subflow between the MPTCP client and the MPTCP server and (ii) a second TCP connection as a second MPTCP subflow between the MPTCP client and the MPTCP server, wherein establishing the first TCP connection and/or the second TCP connection comprises sending toward the MPTCP server information identifying one or more transport control functions, wherein said one or more transport control functions is any one or combination of ordered transfer function, retransmission function of lost packets, flow control function, and congestion control function:
    receive over a non-MPTCP connection a first UDP packet sent by a client capable of communicating via TCP and/or UDP;
    transform the received first UDP packet into a first TCP packet;
    send over the MPTCP connection the first TCP packet toward the MPTCP server,
    receive over the MPTCP connection a second TCP packet sent by the MPTCP server;
    transform the received second TCP packet into a second UDP packet; and
    send over the non-MPTCP connection the second UDP packet toward the client capable of communicating via TCP and/or UDP, wherein the information identifying said one or more transport control functions enables the MPTCP server to apply said one or more transport control functions for the first TCP packet and/or the second TCP packet, wherein
    the first TCP connection is established using a first type of network path, the second TCP connection is established using a second type of network path, and the fast type and the second type are different.

2. The MPTCP client according to claim 1, being further operative to select the one or more transport control functions based on information comprised in the request for establishing the MPTCP connection.

3. The MPTCP client according to claim 1, wherein the information identifying the one or more transport control functions is transmitted as a TCP Option in a TCP SYN packet which is transmitted during establishing the first TCP connection or the second TCP connection.

4. The MPTCP client according to claim 1, wherein the request for establishing the MPTCP connection is a UDP packet sent by a UDP client.

5. The MPTCP client according to claim 1, wherein the MPTCP client is included in any one or combination of a MPTCP proxy, a mobile terminal, and a residential gateway.

6. The MPTCP client according to claim 1, being further operative to apply said one or more transport control functions for the first UDP packet and/or the second UDP packet.

7. The MPTCP client according to claim 1, wherein establishing the MPTCP connection comprises sending toward the MPTCP server a TCP SYN packet, the TCP SYN packet includes a plurality of bits, and each bit of the plurality of bits or a value of the plurality of his is assigned to one of said one or more transport control functions.

8. The MPTCP client according to claim 1, wherein the first type of network path is one of a wired network path and a wireless network path, and the second type of network path is another one of the wired network path and the wireless network path.

9. A Multipath Transmission Control Protocol (MPTCP) server for transporting User Datagram Protocol (UDP) packets, the MPTCP server comprising a processor and a memory storing instructions executed by the processor that cause the MPTCP server operative to:
    during establishing a MPTCP connection with a MPTCP client, receive information identifying one or more transport control functions, sent by the MPTCP client, wherein said one or more transport control functions is any one or combination of ordered transfer function, retransmission function of lost packets, flow control function, and congestion control function and further wherein establishing the MPTCP connection comprises establishing (i) a first TCP connection as a first MPTCP subflow between the MPTCP client and the MPTCP server and (ii) a second TCP connection as a second MPTCP subflow between the MPTCP client and the MPTCP server,
    receive over the MPTCP connection a first TCP packet sent by the MPTCP client;
    transform the received first TCP packet into a first UDP packet;
    send over a non-MPTCP connection the first UDP packet toward a server capable of communicating via TCP and/or UDP;
    receive over the non-MPTCP connection a second UDP packet sent by the server capable of communicating via TCP and/or UDP;
    transform the received second UDP packet into a second TCP packet;
    send over the MPTCP connection the second TCP packet toward the MPTCP client; and
    apply said one or more transport control functions for the first TCP packet and/or the second TCP packet, wherein
    the first TCP connection is established using a first type of network path, the second TCP connection is established using a second type of network path, and the first type and the second type are different.

10. The MPTCP server according to claim 9, wherein the information identifying the one or more transport control functions is received as a TCP Option in a TCP SYN packet which is received during establishing the TCP connection or the second TCP connection.

11. The MPTCP server according to claim 9, wherein the MPTCP server is included in any one or combination of a MPTCP proxy, a mobile terminal, and a residential gateway.

12. The MPTCP server according to claim 9, wherein the first type of network path is one of a wired network path and a wireless network path, and the second type of network path is another one of the wired network path and the wireless network path.

13. A method of transporting User Datagram Protocol (UDP) packets, performed by a Multipath Transmission Control Protocol (MPTCP) client, the method comprising:
receiving a request for establishing a MPTCP connection between the MPTCP client and a MPTCP server;
as a result of receiving the request for establishing the MPTCP connection, establishing the MPTCP connection, establishing the MPTCP connection comprising establishing (i) a first TCP connection as a first MPTCP subflow between the MPTCP client and the MPTCP server and (ii) a second TCP connection as a second MPTCP subflow between the MPTCP client and the MPTCP server, wherein establishing the first TCP connection and/or the second TCP connection comprises sending toward the MPTCP server information identifying one or more transport control functions, wherein said one or more transport control functions is any one or combination of ordered transfer function, retransmission function of lost packets, flow control function, and congestion control function;
receiving over a non-MPTCP connection a first UDP packet sent by a client capable of communicating via TCP and/or UDP;
transforming the received first UDP packet into a first TCP packet; sending over the MPTCP connection the first TCP packet toward the MPTCP server, receiving over the MPTCP connection a second TCP packet sent by the MPTCP server; transforming the received second TCP packet into a second UDP packet; and sending over the non-MPTCP connection the second UDP packet toward the client capable of communicating via TCP and/or UDP, wherein the information identifying said one or more transport control functions enables the MPTCP server to apply said one or more transport control functions for the first TCP packet and/or the second TCP packet, wherein
the first TCP connection is established using a first type of network path,
the second TCP connection is established using a second type of network path, and
the first type and the second type are different.

14. The method according to claim 1, further comprising selecting the one or more transport control functions based on information comprised in the request for enabling the MPTCP connection.

15. The method according to claim 13, wherein, the information identifying the one or more transport control functions is transmitted as a TCP Option in a TCP SYN packet which is transmitted during establishing the first TCP connection or the second TCP connection.

16. The method according to claim 13, wherein the request for establishing the MPTCP connection is a UDP packet sent by a UDP client.

17. The method according to claim 13, wherein the MPTCP client is included in a MPTCP proxy.

18. A computer program product comprising a non-transitory computer-readable storage medium, the non-transitory computer-readable storage medium having a computer program comprising computer-executable instructions for causing a device to perform the method according to claim 13, when the computer-executable instructions are executed on a processing unit included in the device.

19. A method of transporting User Datagram Protocol (UDP) packets performed by a Multipath Transmission Control Protocol (MPTCP) server, the method comprising:
during establishing a MPTCP connection with a MPTCP client, receiving information identifying one or more transport control functions, which was sent by the MPTCP client, wherein said one or more transport control functions is any one or combination of ordered transfer function, retransmission function of lost packets, flow control function, and congestion control function and further wherein establishing the MPTCP connection comprises establishing (i) a first TCP connection as a first MPTCP subflow between the MPTCP client and the MPTCP server and (ii) a second TCP connection as a second MPTCP subflow between the MPTCP client and the MPTCP server;
receiving over the MPTCP connection a first TCP packet sent by the MPTCP client;
transforming the received first TCP packet into a first UDP packet;
sending over a non-MPTCP connection the first UDP packet toward a server capable of communicating via TCP and/or UDP;
receiving over the non-MPTCP connection a second UDP packet sent by the server capable of communicating via TCP and/or UDP;
transforming the received second UDP packet into a second TCP packet;
sending over the MPTCP connection the second TCP packet toward the MPTCP client; and
applying said one or more transport control functions for the first TCP packet and/or the second TCP packet, wherein
the first TCP connection is established using a first type of network path,
the second TCP connection is established using a second type of network path, and
the first type and the second type are different.

20. The method according to claim 19, wherein the information identifying the one or more transport control functions is received as a TCP Option in a TCP SYN packet which is received during establishing the first TCP connection or the second TCP connection.

21. The method according to claim 19, wherein the MPTCP server is included in a MPTCP proxy.

* * * * *